(12) United States Patent
Nishimura

(10) Patent No.: US 8,960,919 B2
(45) Date of Patent: Feb. 24, 2015

(54) IMAGE PROJECTION DEVICE AND IMAGE PROJECTION METHOD

(75) Inventor: So Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 77 days.

(21) Appl. No.: 13/884,591

(22) PCT Filed: Oct. 21, 2011

(86) PCT No.: PCT/JP2011/074267
§ 371 (c)(1),
(2), (4) Date: May 9, 2013

(87) PCT Pub. No.: WO2012/077417
PCT Pub. Date: Jun. 14, 2012

(65) Prior Publication Data
US 2013/0222775 A1 Aug. 29, 2013

(30) Foreign Application Priority Data
Dec. 8, 2010 (JP) .................... 2010-273547

(51) Int. Cl.
*G03B 21/20* (2006.01)
*G03B 21/28* (2006.01)
(Continued)

(52) U.S. Cl.
CPC .......... *H04N 9/3129* (2013.01); *G03B 21/2033* (2013.01); *H04N 9/3161* (2013.01);
(Continued)

(58) Field of Classification Search
CPC .... G03B 21/00; G03B 21/20; G03B 21/2013; G03B 21/2033; G03B 21/2066; G03B 21/28; G03B 21/14; G03B 21/142; G03B 21/147; G03B 21/204; G03B 21/2053; G03B 21/206; G03B 21/56; H04N 9/31; H04N 9/3129; H04N 9/3132; H04N 9/3161; H04N 9/3164; H04N 9/3179; H04N 9/3191; H04N 9/3135; H04N 9/3194; G02B 26/10; G02B 26/101
USPC ....... 353/30–31, 37, 85, 94, 98–99; 359/196.1, 197.1, 201.1–201.2, 202.1, 359/203.1, 204.1–204.2, 204.4, 359/212.1–212.2, 213.1, 214.1, 443, 452; 345/81
See application file for complete search history.

(56) References Cited

U.S. PATENT DOCUMENTS 5,614,961 A * 3/1997 Gibeau et al. ................. 348/750
6,800,844 B2 * 10/2004 Kandori et al. ............... 250/234
(Continued)

FOREIGN PATENT DOCUMENTS

CN 101498884 A 8/2009
CN 101517634 A 8/2009
(Continued)

OTHER PUBLICATIONS
International Search Report in PCT/JP2011/074267 dated Dec. 13, 2011(English Translation Thereof).
(Continued)

*Primary Examiner* — Georgia Epps
*Assistant Examiner* — Jori S Reilly-Diakun
(74) *Attorney, Agent, or Firm* — McGinn IP Law Group, PLLC

(57) ABSTRACT

An image projection device includes a number-of-times measurement section that measures the number of passage times that the scanned laser light has passed through the light radiation members, a time measurement section that is triggered to measure an elapsed time when the number-of-times measurement section measures the number of passage times, an arithmetic section that calculates an initial timing at which the laser light source section starts outputting the laser light based on the measurement results of the number-of-times measurement section and the time measurement section, and a signal generation section that generates the switch signal at the initial timing calculated by the arithmetic section.

20 Claims, 16 Drawing Sheets

(51) Int. Cl.
    *H04N 9/31*    (2006.01)
    *G03B 21/56*   (2006.01)
    *G03B 21/14*   (2006.01)

(52) U.S. Cl.
    CPC .......... *H04N9/3179* (2013.01); *G03B 21/2053* (2013.01); *G03B 21/206* (2013.01); *G03B 21/28* (2013.01); *G03B 21/56* (2013.01); *G03B 21/204* (2013.01); *H04N 9/3135* (2013.01); *H04N 9/3194* (2013.01); *G03B 21/14* (2013.01)
    USPC ................... 353/31; 353/85; 353/94; 353/98; 359/197.1; 359/212.1; 359/452; 345/81

(56)              References Cited

U.S. PATENT DOCUMENTS

| | | | | |
|---|---|---|---|---|
| 7,733,310 | B2 * | 6/2010 | Hajjar et al. | 345/84 |
| 7,791,561 | B2 * | 9/2010 | Hajjar et al. | 345/32 |
| 7,993,005 | B2 * | 8/2011 | Peterson | 353/30 |
| 7,994,702 | B2 * | 8/2011 | Bukesov et al. | 313/498 |
| 8,013,506 | B2 * | 9/2011 | Bukesov et al. | 313/483 |
| 8,169,454 | B1 * | 5/2012 | Hajjar et al. | 347/235 |
| 8,384,625 | B2 * | 2/2013 | Hajjar et al. | 345/75.1 |
| 8,519,324 | B2 * | 8/2013 | Tsuida | 250/235 |
| 8,698,713 | B2 * | 4/2014 | Hajjar et al. | 345/81 |
| 8,803,772 | B2 * | 8/2014 | Kent et al. | 345/81 |
| 2003/0015652 | A1 | 1/2003 | Kandori et al. | |
| 2005/0140930 | A1 * | 6/2005 | Dvorkis et al. | 353/31 |
| 2006/0221021 | A1 * | 10/2006 | Hajjar et al. | 345/84 |
| 2006/0221022 | A1 * | 10/2006 | Hajjar | 345/84 |
| 2007/0014318 | A1 * | 1/2007 | Hajjar et al. | 372/9 |
| 2007/0187616 | A1 | 8/2007 | Burroughs et al. | |
| 2008/0068295 | A1 * | 3/2008 | Hajjar | 345/3.2 |
| 2009/0001272 | A1 * | 1/2009 | Hajjar | 250/354.1 |
| 2009/0174632 | A1 * | 7/2009 | Hajjar et al. | 345/81 |
| 2011/0109529 | A1 * | 5/2011 | Hajjar et al. | 345/32 |
| 2011/0141150 | A1 * | 6/2011 | Hajjar et al. | 345/690 |

FOREIGN PATENT DOCUMENTS

| | | |
|---|---|---|
| CN | 101689341 A | 3/2010 |
| JP | 03-065916 A | 3/1991 |
| JP | 2002-365568 A | 12/2002 |
| JP | 2005-242035 A | 9/2005 |
| JP | 2008-309935 A | 12/2008 |
| JP | 2009-198988 A | 9/2009 |
| JP | 2009-537868 A | 10/2009 |
| JP | 2009-539120 A | 11/2009 |
| JP | 2010-533307 A | 10/2010 |

OTHER PUBLICATIONS

Chinese Office Action dated Sep. 29, 2014 with an English translation thereof.

* cited by examiner

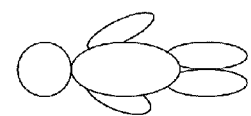
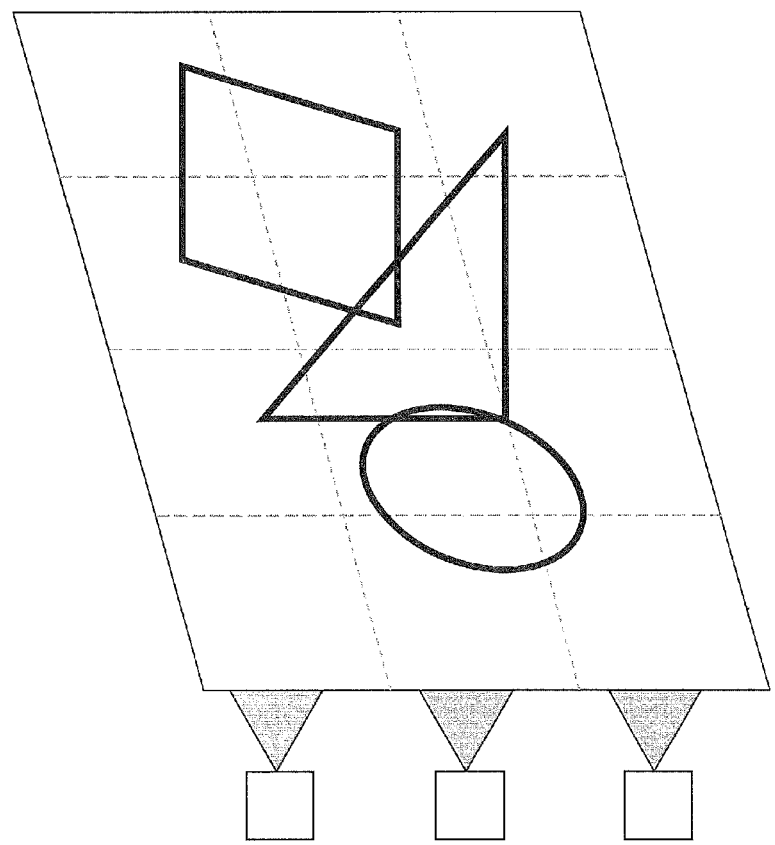
Fig.2

Fig.7
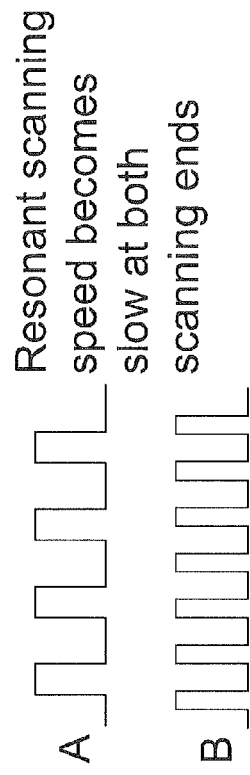
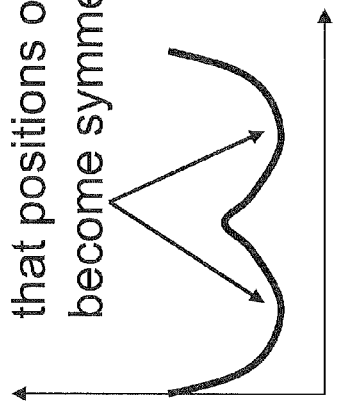
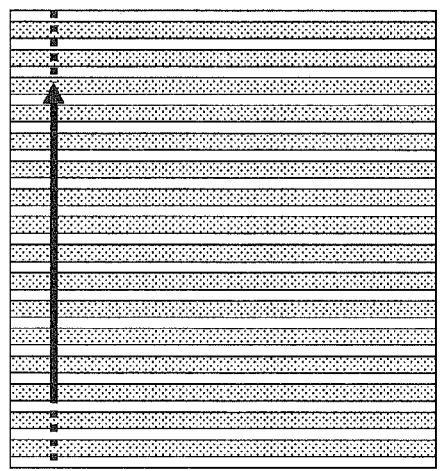
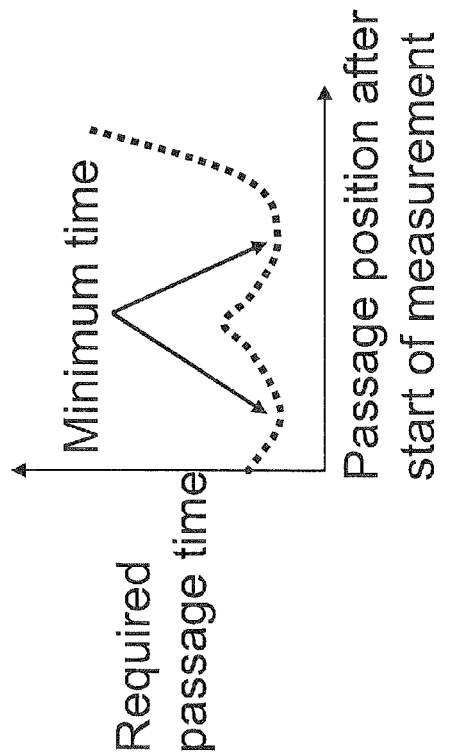

Fig.9
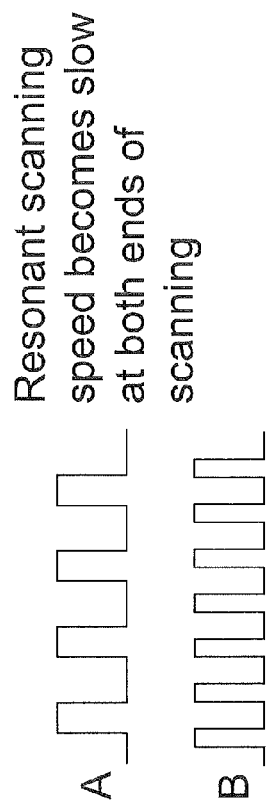
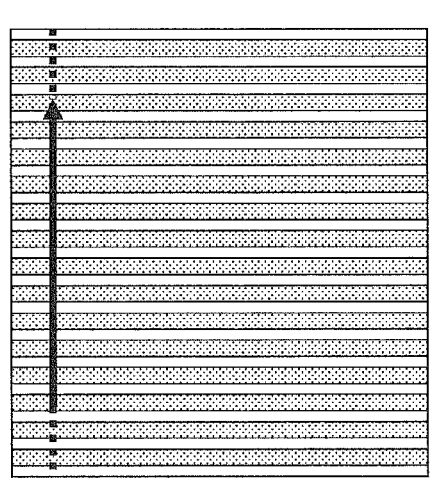
A: Resonant scanning speed becomes slow at both ends of scanning
B: Initial timing is changed such that it becomes the minimum at center
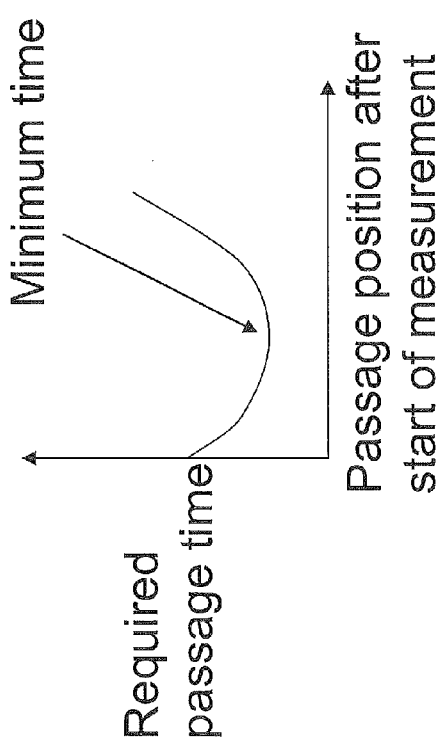

Fig.16
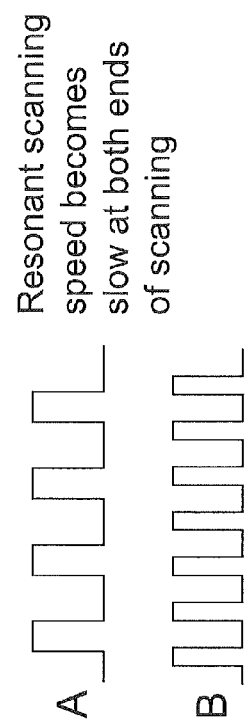
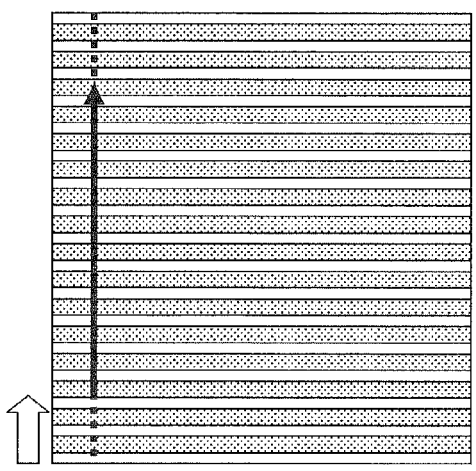
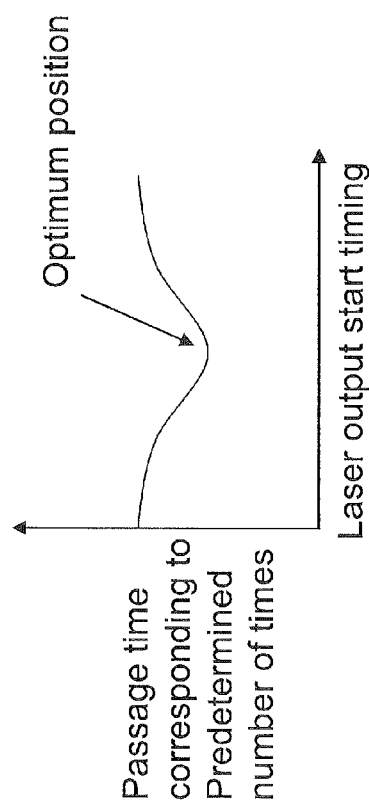

IMAGE PROJECTION DEVICE AND IMAGE PROJECTION METHOD

TECHNICAL FIELD

The present invention relates to an image projection device and an image projection method that scan laser light and project an image.

BACKGROUND ART

In recent years, laser light sources that are small and inexpensive have been manufactured. In addition, as MEMS (Micro Electronic Mechanical Systems) techniques have been advanced, scanning elements that are small and that vibrate at high speeds have been developed.

Under such a circumstance, scanning type laser projectors that cause a scanning element such as an MEMS mirror to deflect the angle of laser light and scan the laser light on a projection target section, and draw an image have been developed (for example, refer to Patent Literature 1).

RELATED ART LITERATURE

Patent Literature

Patent Literature 1: JP3-65916A, Publication
Patent Literature 2: JP2009-539120A, Publication (translation version)

SUMMARY OF THE INVENTION

Problem to be Solved by the Invention

To project a scanned image, laser light that is output from a laser light source is necessary to synchronize with driving of a scanning element. However, as shown in FIG. 1, since driving of the scanning element delays from an electric drive signal, they cannot be caused to fully synchronize with each other based on only electric characteristics. Thus, when the device is manufactured, laser light that is output and driving of the scanning element are caused to synchronize with each other using human eyes, a camera, or the like.

In addition, driving of the scanning element delays depending on the characteristics of the scanning element. If the scanning element is a resonant scanning element such as a resonance type MEMS mirror, since the characteristics of the scanning element depend on the ambient temperature, they may adversely change depending on the environment in which the scanning element is used. In other words, laser light that is output and driving of the scanning element cannot be caused to fully synchronize with each other by such adjustment performed when the device is manufactured. This problem is critical particularly in resonant scanning elements.

As a means that can solve this problem, a technique that detects light reflected by a special mark provided beyond a drawing range and thereby causes laser light that is output and driving of the scanning element to synchronize with each other is known (refer to Patent Literature 2). However, this technique does not consider resonant scanning elements and thereby cannot deal with changes of the characteristics of the scanning elements that depend on the environment in which they are used. In the technique described in Patent Literature 2, since a mark is located beyond the drawing range, a problem in which multi projection cannot be performed arises.

In this context, multi projection is a technique in which a plurality of projectors are arranged as shown in FIG. 2 and projected images of the projectors are processed such that one large image is projected.

Therefore, an object of the present invention is to provide an image projection device and an image projection method that cause laser light that is output from a laser light source and driving of the scanning element to synchronize with each other and that can use the multi projection technique and that can deal with changes of the characteristics of the scanning element in the environment where it is used.

Means that Solve the Problem

An image projection device according to the present invention, comprising:
a laser light source section that outputs laser light;
a laser scanning section that deflects the laser light that is output from said laser light source section and scans the laser light;
a projection target section to which said laser scanning section projects the scanned laser light;
a light detection section that detects light radiated from said projection target section; and
a control section that controls said laser light source section,
wherein said projection target section is composed of light radiation members that radiate light that said light detection section can detect when the scanned laser light is projected to said light radiation members, said light radiation members being regularly arranged; and non-light radiation members that do not radiate light that said light detection section can detect when the scanned laser light is projected to said non-light radiation members,
wherein said control section includes:
a laser output switch signal generation section that generates a switch signal that switches between an ON state and an OFF state of laser light that is output from said laser light source section based on a detection result of said light detection section; and
a laser light source modulation signal generation section that generates a modulation signal of said laser light source based on the switch signal generated by said laser output switch signal generation section and an image signal that is input from the outside of said image projection device, and
wherein said laser output switch signal generation section includes:
a number-of-times measurement section that measures the number of passage times the scanned laser light has passed through said light radiation members based on the detection result of said light detection section;
a time measurement section that is triggered to measure an elapsed time when said number-of-times measurement section measures the number of passage times;
an arithmetic section that calculates an initial timing at which said laser light source section starts outputting the laser light based on the measurement results of said number-of-times measurement section and said time measurement section; and
a signal generation section that generates said switch signal at the initial timing calculated by said arithmetic section.

An image projection method according to the present invention is an image projection method for an image projection device, including:

a laser light source section that outputs laser light;

a laser scanning section that deflects the laser light that is output from said laser light source section and scans the laser light;

a projection target section to which said laser scanning section projects the scanned laser light;

a light detection section that detects light radiated from said projection target section; and a control section that controls said laser light source section, wherein said projection target section is composed of light radiation members that radiate light that said light detection section can detect when the scanned laser light is projected to said light radiation members, said light radiation members being regularly arranged; and non-light radiation members that do not radiate light that said light detection section can detect when the scanned laser light is projected to said non-light radiation members, said image projection method comprising:

a switch signal generation step that causes said control section to generate a switch signal that switches between an ON state and an OFF state of laser light that is output from said laser light source section based on a detection result of said light detection section; and a laser light source modulation signal generation step that causes said control section to generate a modulation signal of said laser light source based on the switch signal generated by said laser output switch signal generation section and an image signal that is input from the outside of said image projection device, wherein said laser output switch signal generation step includes:

a number-of-times measurement step that measures the number of passage times the scanned laser light has passed through said light radiation members based on the detection result of said light detection section;

a time measurement step that is triggered to measure an elapsed time when the number of passage times is measured at said number-of-times measurement step;

an arithmetic step that calculates an initial timing at which said laser light source section starts outputting the laser light based on the measurement results obtained at said number-of-times measurement step and said time measurement step; and a signal generation step that generates said switch signal at the initial timing calculated at said arithmetic step.

Effect of the Invention

According to the present invention, laser light that is output from the laser light source section is scanned on the projection target section by the laser scanning section. The number of passage times and the elapsed time during which the scanned laser light has passed through the light radiation members are measured based on the detection result for light radiated from the light radiation members on the projection target section. The initial timing at which the laser light source section starts outputting laser light is calculated based on the measured result. The switch signal that switches between an ON state and an OFF state of laser light that is output from the laser light source section is generated at the initial timing.

Thus, an effect in which laser light that is output is caused to synchronize with driving of the scanning element can be obtained.

In addition, an effect in which a predetermined mark beyond the drawing range is not used and the multi projection technique is used can be obtained. Moreover, an effect in which the characteristics of the scanning element that change depending on the environment in which it is used are adjusted when it is driven can be obtained.

BRIEF DESCRIPTION OF DRAWINGS

FIG. 2 is a schematic diagram describing the concept of multi projection.

FIG. 7 is a schematic diagram describing the concept of the processes of the laser output switch signal generation section according to the first embodiment of the present invention.

FIG. 9 is a schematic diagram describing the concept of the processes of the laser output switch signal generation section according to the second embodiment of the present invention.

FIG. 16 is a schematic diagram describing the concept of the processes of the laser output switch signal generation section according to the fourth embodiment of the present invention.

BEST MODES THAT CARRY OUT THE INVENTION

Next, with reference to the accompanying drawings, modes of the present invention will be described.

(1) Basic Mode

First, a basic mode of the present invention will be described.

Figure 1:
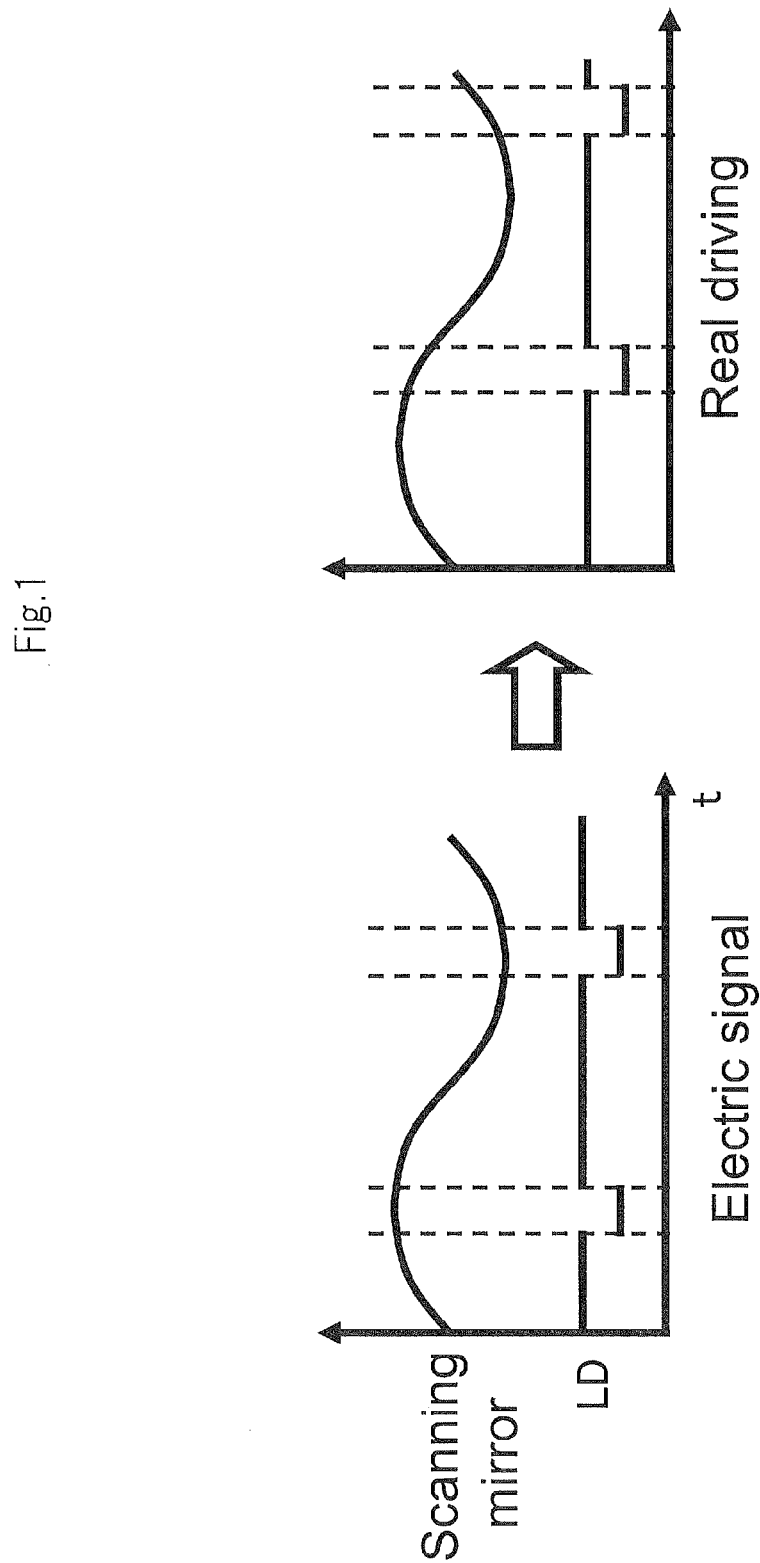
FIG. 1 is a schematic diagram describing the relationship between an electric signal of an image projection device and driving of a scanning element.
Figure 3:
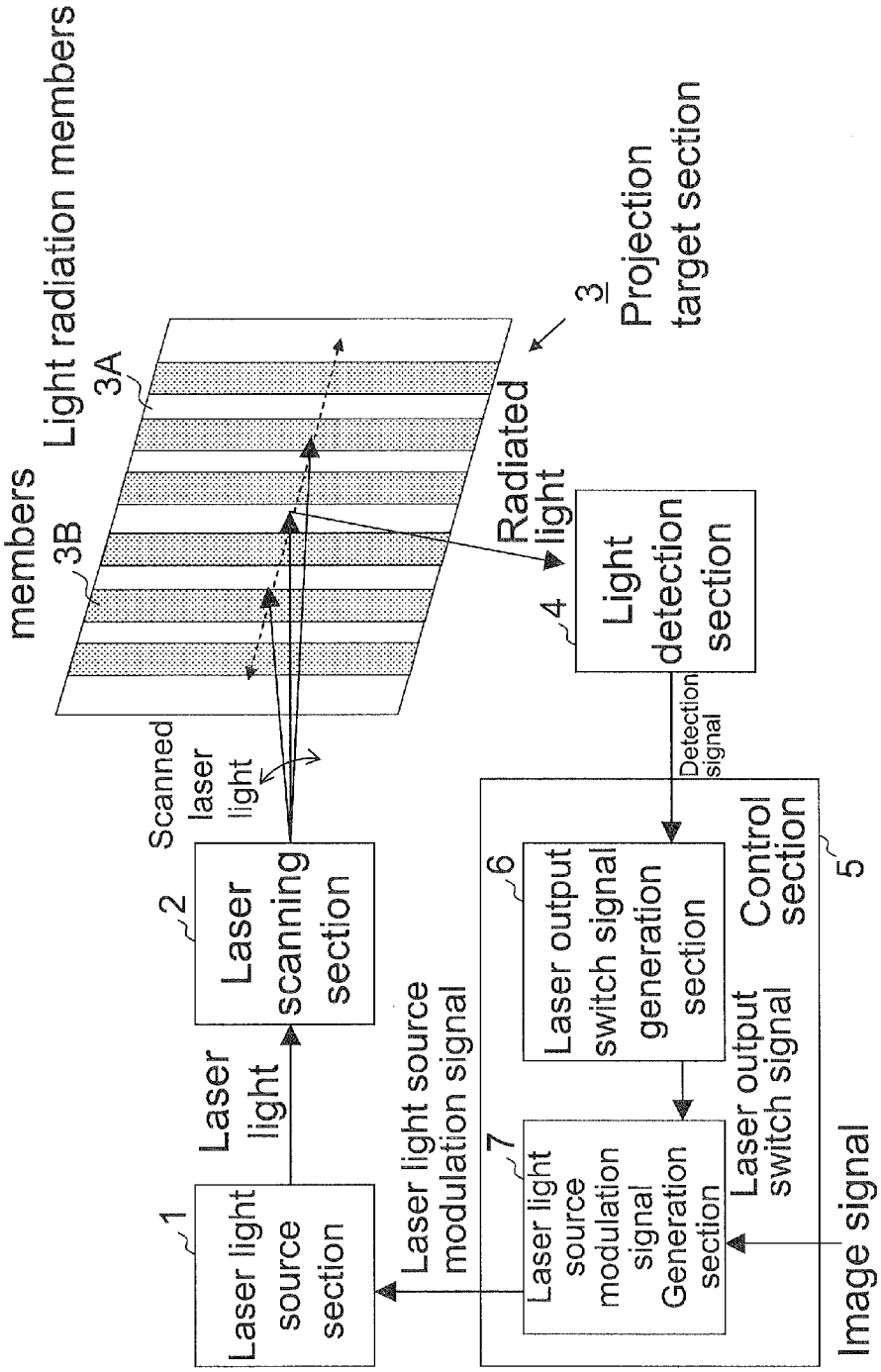
FIG. 3 is a block diagram showing the structure of an image projection device according to the present invention.

FIG. 3 is a block diagram showing the structure of an image projection device according to the present invention.

As shown in FIG. 3, the image projection device according to the present invention has laser light source section 1, laser scanning section 2, projection target section 3, light detection section 4, and control section 5. Projection target section 3 has light radiation members 3A and non-light radiation members 3B. Control section 5 has laser output switch signal generation section 6 and laser light source modulation signal generation section 7.

Laser light that is output from laser light source section 1 enters laser scanning section 2 that deflects and scans the laser light. The scanned laser light that has been scanned by laser scanning section 2 passes through light radiation members 3A and non-light radiation members 3B arranged on projection target section 3. When the scanned laser light is projected on light radiation members 3A, they radiate light that light detection section 4 can detect. Light detection section 4 detects the light and converts it into a detection signal. The detection signal is input to laser output switch signal generation section 6 located in control section 5. Laser output switch signal generation section 6 performs an arithmetic process based on the input detection signal so as to generate a laser output switch signal that switches between an ON state and an OFF state of the laser light that is output from laser light source section 1. Laser light source modulation signal generation section 7 generates a laser light source modulation signal based on the laser output switch signal and an image signal that is input from the outside of the device. Laser light source section 1 outputs laser light that is modulated with the laser light source modulation signal. Laser light source section 1 outputs laser light that is modulated with the laser light source modulation signal.

Laser scanning section 2 has at least one scanning element. One of the scanning elements of laser scanning section 2 is a resonant scanning element that reciprocally resonates in the scanning direction where the scanning element scans laser light at the highest speed. A raster scan that is an image projection technique is performed by combining horizontal scanning where laser light is vibrated at a high speed and vertical scanning where laser light is vibrated at a low speed. A scanning element that scans laser light in such a manner is, for example, an MEMS mirror. The image projection device according to the present invention resonates in the scanning direction where the scanning element scans laser light at the highest speed.

Light radiation members 3A are regularly arranged. For simplicity, it is assumed that projection target section 3 is formed in a plane shape and located opposite to the scanning element. In this example, it is assumed that light radiation members 3A and non-light radiation members 3B are arranged at an equal interval in the scanning direction at which the scanning element scans laser light at the highest speed. Alternatively, light radiation members 3A may be arranged at a non-equal interval and projection target section 3 may be formed in a non-plane shape. In this case, however, the control operation according to the present invention may be changed corresponding to the shapes of light radiation members 3A and projection target section 3.

Light radiation members 3A may be formed in the following ways.

(A) Light radiation members 3A may be made of a light diffusion material or the like such that light radiation members 3A diffuse the projected laser light and radiate it to light detection section 4.

(B) Light radiation members 3A may be made of a retroreflective material, a reflective material, or the like such that light radiation members 3A radiate the projected laser light having a large intensity in a predetermined reaction.

(C) Light radiation members 3A may be made of a phosphor or the like such that light radiation members 3A are excited to emit light having projected laser light.

When the scanned laser light is projected to non-light radiation members 3B, they do not radiate light that light detection section 4 can detect.

Non-light radiation members 3B may be formed in the following ways.

(A) Non-light radiation members 3B may be made of a light absorption material or the like such that non-light radiation members 3B absorb the projected laser light and thereby do not radiate light to light detection section 4.

(B) Non-light radiation members 3B may be made of a light transmission material or the like such that non-light radiation members 3B transmit the projected laser light and thereby do not radiate the projected laser light to light detection section 4.

(C) Non-light radiation members 3B may be made of a retroreflective material, a reflective material, or the like such that non-light radiation members 3B radiate the projected laser light having a large intensity in a predetermined direction, but do not radiate the projected laser light having a large intensity in the direction of light detection section 4 and thereby light detection section 4 cannot detect a meaningful value.

(D) Non-light radiation members 3B may be made of a diffusion material or the like that diffuses the projected laser light having a low intensity such that light detection section 4 cannot detect a meaningful value. At this point, however, the intensity of light radiated from light radiation members 3A is necessary to be greater than the intensity of light that is radiated from non-light radiation members 3B.

(E) At least either light radiation members 3A or non-light radiation members 3B have a wavelength conversion function such that the wavelength of light radiated from light radiation members 3A is different from the wavelength of light radiated from non-light radiation members 3B. In addition, light detection section 4 has a wavelength selective filter such that light detection section 4 does not detect light radiated from non-light radiation members 3B.

The present invention is particularly suitable for a rear type laser projector that uses phosphors. In this case, projection target section 3 may be formed in the following ways.

(A) Laser light source section 1 may be composed of an invisible laser (with a wavelength of, for example, 40 nm or less). Light radiation members 3A may be made of RGB phosphors that are excited to emit light having invisible laser light. Laser light source section 1 can change a laser output corresponding to an image signal such that a desired image is displayed.

(B) Laser light source section 1 may be composed of a visible laser (with a wavelength of, for example, 400 nm or less, blue). Light radiation members 3A may be made of RGB phosphors that are excited to emit light having visible laser light. Non-light radiation members 3B may have a diffusion structure. Laser light source section 1 can vary the laser output corresponding to an image signal. Light radiation members 3A may have a blue light diffusion structure.

(C) Laser light source section 1 may be composed of RGB lasers (with wavelengths of, for example, 450 nm, blue; 530 nm, green; and 630 nm, red). Laser light source section 1 modulates laser light corresponding to individual color image signals.

In any of the foregoing cases, light radiation members 3A are not necessary to be arranged corresponding to individual color pixels. In addition, non-display regions may be arranged between each color pixel. The non-display regions may have a diffusion structure, a reflective structure, or the like as light radiation members 3A.

According to the present invention, the laser light source section can be controlled based on light emitted from phosphors that compose an image or light radiated from the non-display regions arranged between phosphors. Thus, unlike the related art, it is not necessary that special marks be formed. As a result, the present invention is suitable for a rear type image projection device that can use the multi projection technique that smoothly combines a plurality of images.

According to the present invention, light radiation members 3A and non-light radiation members 3B may be regularly arranged beyond the drawing range.

Light detection section 4 detects light radiated from light radiation members 3A and outputs a detection signal corresponding to the detected light. At this point, light detection section 4 may convert the detected light into an electric signal and output the converted signal or may output the detected light itself as an optical signal. The detected light may be converted into an electric signal by using, for example, a PD (Photo Diode), an APD (Avalanche Photo Diode), or the like. On the other hand, if the detected light is output, light is coupled with an optical fiber so as to output an optical signal.

Laser output switch signal generation section 6 does not use the intensity of light as a control signal. Thus, light detection section 4 may have a comparator so as to convert light into a digital data sequence having a width of one bit.

Figure 4:
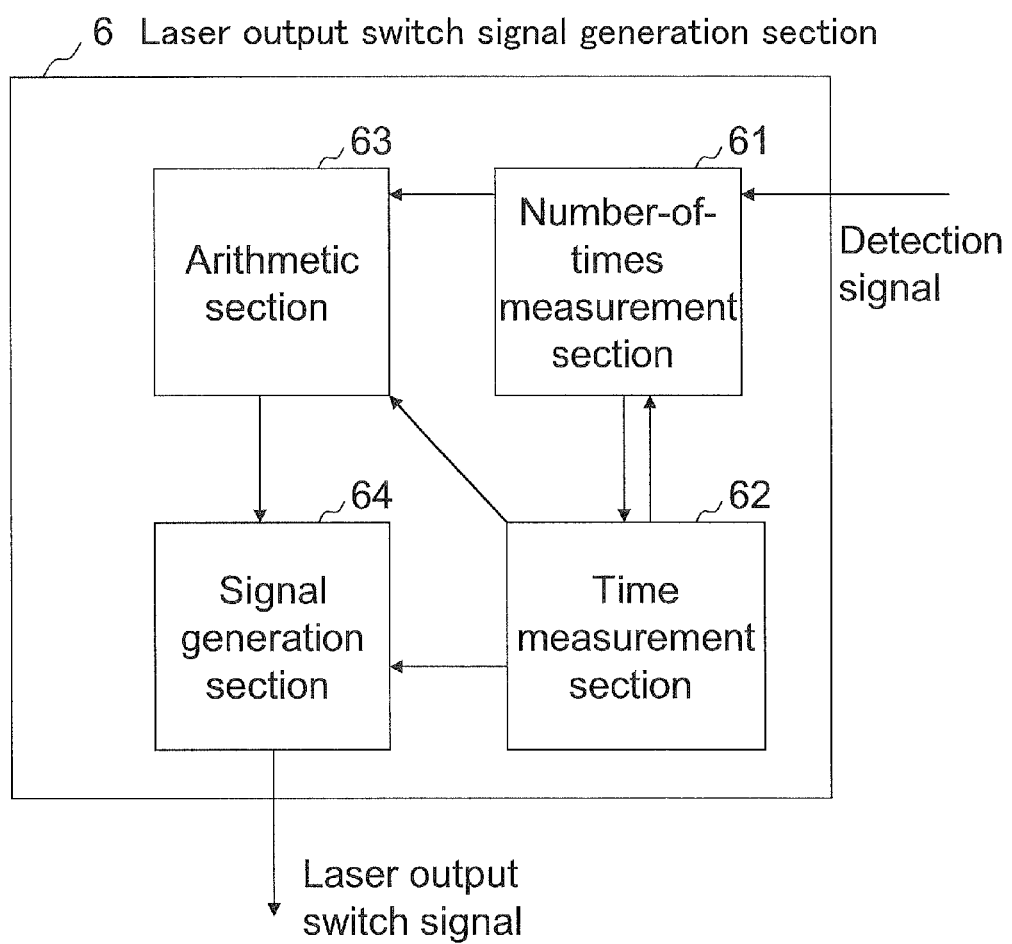
FIG. 4 is a block diagram showing the structure of a laser output switch signal generation section according to the present invention.

Laser output switch signal generation section 6 has a basic structure shown in FIG. 4.

As shown in FIG. 4, laser output switch signal generation section 6 according to the present invention has number-of-times measurement section 61, time measurement section 62, arithmetic section 63, and signal generation section 64.

The detection signal detected by light detection section 4 is input to number-of-times measurement section 61. The detection signal is a non-continuous signal that varies as the laser light scans light radiation members 3A and non-light radiation members 3B. Number-of-times measurement section 61 has a function that counts the number of leading edges, trailing edges, or both. With this function, number-of-times measurement section 61 measures the number of times the scanned laser light has passed through light radiation members 3A. Time measurement section 62 has a function that measures the elapsed time. Time measurement section 62 is triggered by a signal that is output from number-of-times measurement section 61 to measure the elapsed time. Information measured by number-of-times measurement section 61 and time measurement section 62 is sent to arithmetic section 63. Arithmetic section 63 performs an optimization process that optimizes the initial timing at which laser light source section 1 starts outputting laser light based on the information obtained from number-of-times measurement section 61 and time measurement section 62. Signal generation section 64 generates a laser output switch signal that causes laser light source section 1 to start outputting laser light at the initial timing. The details of the optimization process performed by arithmetic section 63 will be described in (2) Preferred Modes of the Present Invention.

The laser output switch signal is input to laser light source modulation signal generation section 7. Laser light source modulation signal generation section 7 generates a laser light source modulation signal based on the laser output switch signal and an image signal that is input from the outside of the image projection device. When the laser output switch signal is ON, laser light source modulation signal generation section 7 generates the laser light source modulation signal. When the laser output switch signal is OFF, laser light source modulation signal generation section 7 does not generate the laser light source modulation signal.

When the laser output switch signal is optimized according to the present invention, the laser light source modulation signal is a signal that adjusts the output timing at which laser light source section 1 outputs laser light, laser light source modulation signal generation section 7 outputs the laser light source modulation signal corresponding to the laser output switch signal regardless of the image signal that is input. In other words, when the laser output switch signal is ON, the laser light source modulation signal becomes ON. When the laser output switch signal is OFF, the laser light source modulation signal becomes OFF.

After the laser output switch signal has been optimized according to the present invention, the laser light source modulation signal corresponding to the laser output switch signal and the image signal is input to laser light source section 1. Laser light that is output from laser light source section 1 is scanned by laser scanning section 2 and thereby an image is drawn on projection target section 3.

Next, laser output switch signal generation section 6 will be described in detail. In the following description, the structure other than laser output switch signal generation section 6 is the same as the foregoing structure.

(2) Preferred Modes of Present Invention (2-1) First Embodiment

Figure 5:
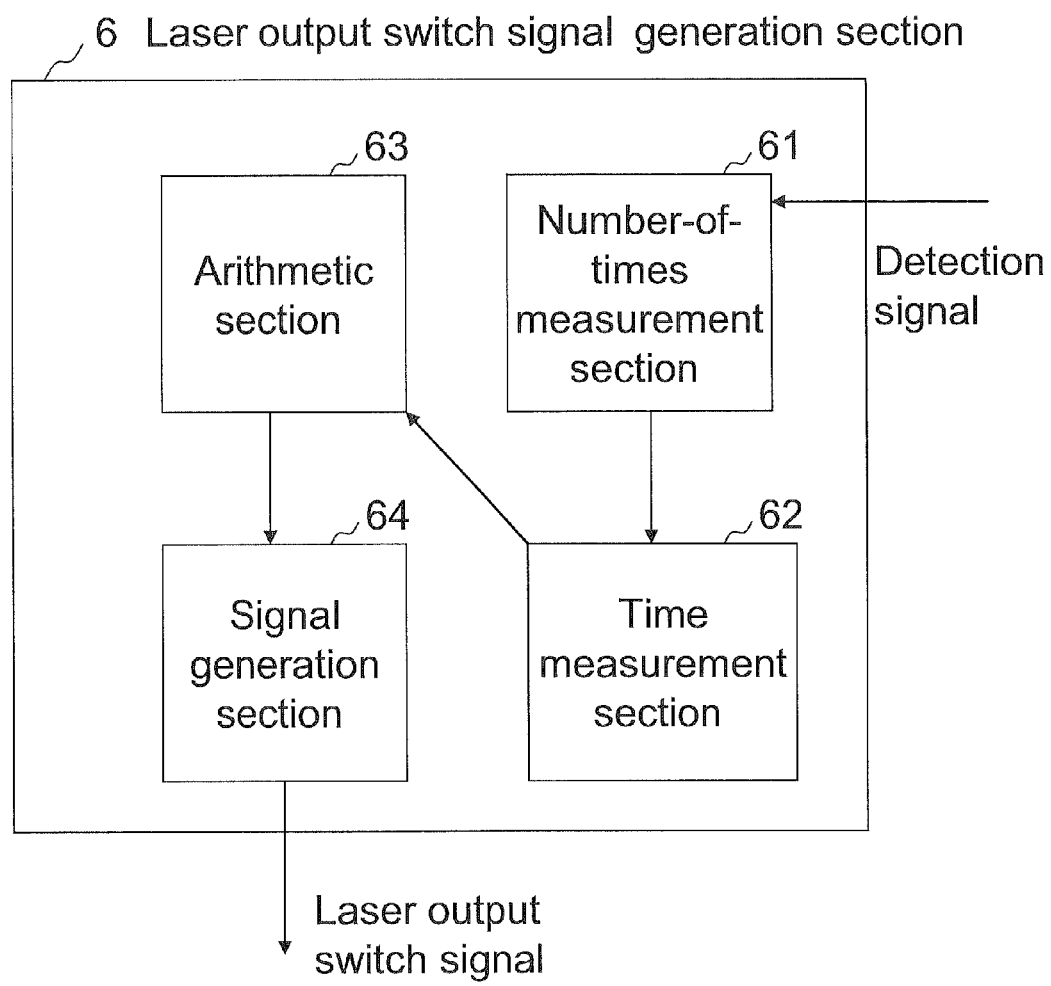
FIG. 5 is a block diagram showing the structure of a laser output switch signal generation section according to a first embodiment and a second embodiment of the present invention.
Figure 6:
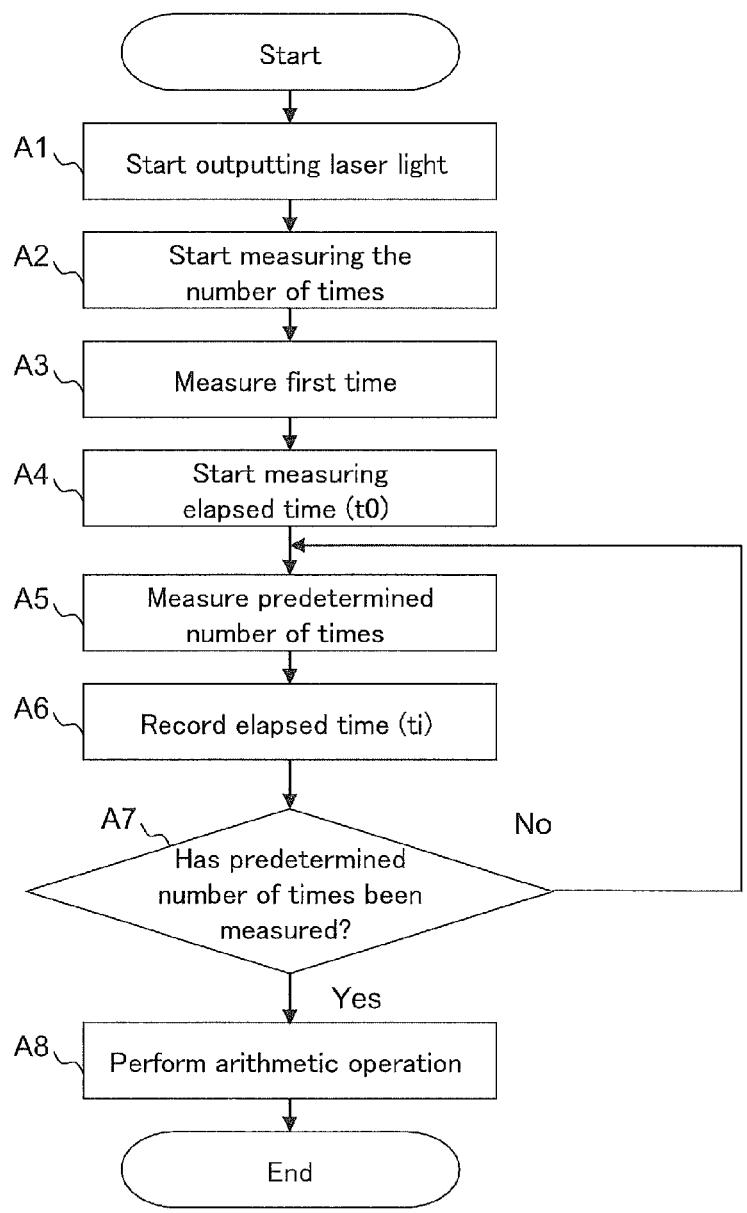
FIG. 6 is a flow chart describing a flow of processes of the laser output switch signal generation section according to the first embodiment and the second embodiment of the present invention.

FIG. 5 shows the structure of laser output switch signal generation section 6 according to a first embodiment of the present invention. FIG. 6 shows the flow of processes of the laser output switch signal generation section 6. FIG. 7 shows the concept of the processes of laser output switch signal generation section 6.

Figure 8:
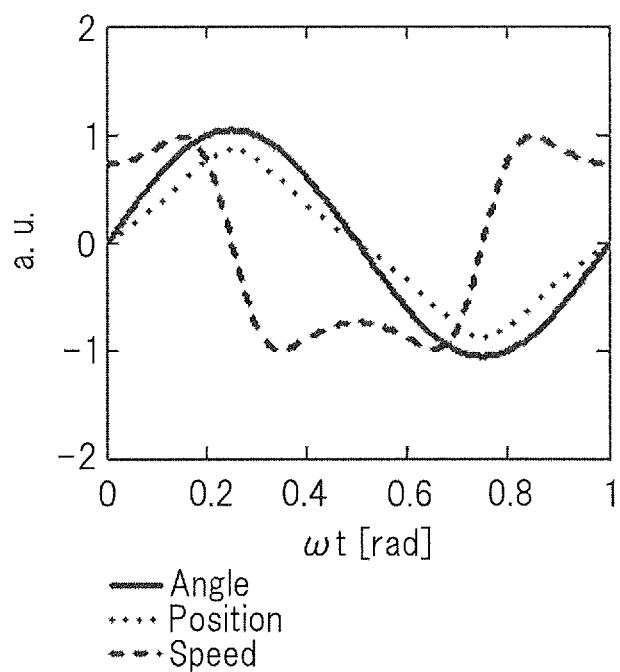
FIG. 8 is a schematic diagram describing the concept of driving of a resonant scanning element having a maximum deflection angle of 60 [deg].

FIG. 8 shows the concept of driving of a resonant scanning element that composes laser scanning section 2. The resonant scanning element shown in FIG. 8 has a maximum deflection angle of 60 [deg].

The resonant scanning element has the following driving profile.

The angle of the resonant scanning element is represented by the following formula.

$$\theta(t) = \theta_{max} \sin(\omega t) \quad \text{[Mathematical Expression 1]}$$

where $\theta_{max}$ is the maximum deflection angle of the resonant scanning element; $\omega$ is the driving frequency.

When projection target section 3 is formed in a plane shape and is located opposite to the resonant scanning element, the position of the resonant scanning element can be expressed by the following formula.

$$x(t) = z \tan(\theta(t)) = z \tan(\theta_{max} \sin(\omega t)) \quad \text{[Mathematical Expression 2]}$$

The speed of the resonant scanning element can be expressed by differentiating the position.

$$v(t) = \frac{d}{dt} x(t) = \frac{z \theta_{max} \omega \cos(\omega t)}{\cos(\theta_{max} \sin(\omega t))^2} \quad \text{[Mathematical Expression 3]}$$

As shown in FIG. 8, the speed distribution of the resonant scanning element has a speed profile that is symmetrical with respect to $\omega t = \pi N$ (where N is an integer), namely, the center of scanning.

Thus, if the speed distribution of the resonant scanning element becomes symmetrical when laser light is output, laser light that is output is caused to synchronize with driving of the resonant scanning element.

FIG. 6 shows an example of an algorithm that accomplishes the foregoing synchronization.

As shown in FIG. 6, signal generation section 64 sets the initial laser output start timing to 0 and then generates the laser output switch signal having a length corresponding to one line of the scanning direction in which the resonant scanning element resonates at the initial timing.

When laser light source section 1 starts output laser light (at step A1), number-of-times measurement section 61 starts measuring the number of times the scanned laser light has passed through light radiation members 3A (at step A2). When the scanned laser light has passed through light radiation members 3A first time (at step A3), number-of-times measurement section 61 sends a signal to time measurement section 62. Time measurement section 62 is triggered by the signal to start measuring the time (at step A4).

When number-of-times measurement section 61 has measured the scanned laser light that has passed through light radiation members 3A a predetermined number of times, for example, three times (at step A5), number-of-times measurement section 61 sends the signal to time measurement section 62 again. Time measurement section 62 sends the elapsed time after it has started measuring the time until it has received the signal again (namely, the elapsed time during which the scanned laser light has passed through light radiation members 3A for the predetermined number of times, hereinafter referred to as required passage time) to arithmetic section 63. Arithmetic section 63 stores the required passage time (at step A6). Thereafter, the foregoing processes are repeated for the the number of times corresponding to one line (at step A7).

The inverse number of a time series of the required passage time transmitted from time measurement section 62 to arithmetic section 63 (the distribution (FIG. 7) in which the passage position after start of measurement (equivalent to the laser output time for one line) is plotted on the horizontal axis and the required passage time is plotted on the vertical axis) is equivalent to the speed profile of the resonant scanning element. As described above, when laser light is optimally output, the speed profile of the resonant scanning element must become symmetrical.

Arithmetic section 63 calculates the initial laser output start timing that causes the distribution shown in FIG. 7 to become symmetrical with respect to the center of the laser output time for one line (at step A5, FIG. 7). Thereafter, arithmetic section 63 transmits the result to signal generation section 64.

The center of the symmetry of the speed profile of the resonant scanning element may be detected by calculating the differential amount of the speed distribution and determining the center based on the change point of the speed distribution and the value thereof.

Signal generation section 64 generates the laser output switch signal at the initial laser output start timing calculated by arithmetic section 63.

The laser output switch signal can be optimally generated based on the foregoing algorithm.

(2-2) Second Embodiment

FIG. 9 shows the concept of processes of laser output switch signal generation section 6 according to a second embodiment of the present invention. The structure (FIG. 5) and the flow (FIG. 6) of processes of laser output switch signal generation section 6 are the same as those of laser output switch signal generation section 6 according to the first embodiment.

Figure 10:
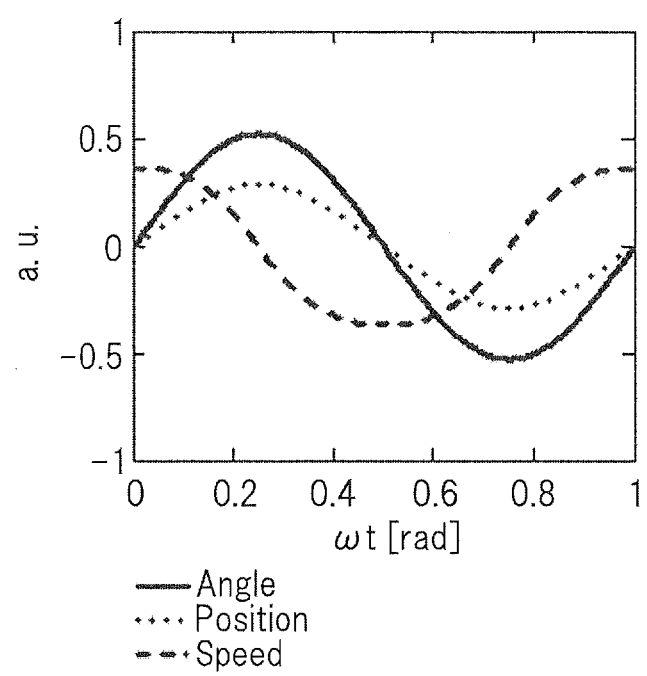
FIG. 10 is a schematic diagram describing the concept of driving of a resonant scanning element having a maximum amplitude of 30 [deg].

FIG. 10 shows the concept of driving of a resonant scanning element that composes laser scanning section 2. The resonant scanning element shown in FIG. 10 has a maximum deflection angle of 30 [deg].

The speed distribution of the resonant scanning element can be expressed by the following formula.

$$v(t) = \frac{d}{dt}x(t) = \frac{z\theta_{max}\omega\cos(\omega t)}{\cos(\theta_{max}\sin(\omega t))^2} \quad \text{[Mathematical Expression 4]}$$

As shown in FIG. 10, the resonant scanning element has a speed distribution profile in which the scanning speed becomes the maximum at $\omega t = \pi N$ (where N is an integer), namely the center of scanning, when the maximum deflection angle is around 45 degrees or less (namely, the scanning speed is the maximum at the center of scanning and becomes low at both ends of scanning). In other words, the number of times the projected laser light passes through light radiation members 3A for a predetermined time is small at both ends of scanning where the scanning speed is slow and is large at the center of scanning where the scanning speed is fast.

At this point, the center of symmetry of the speed profile of the resonant scanning element is located at the position where the scanning speed becomes the maximum (the minimum time in the time series of the required passage time).

Thus, arithmetic section 63 calculates the amount of initial laser output start timing such that the laser output time for one line becomes the minimum at the center of the distribution shown in FIG. 9.

As a result, the algorithm based on which arithmetic section 63 calculates the initial laser output start timing can be simplified.

(2-3) Third Embodiment

Figure 11:
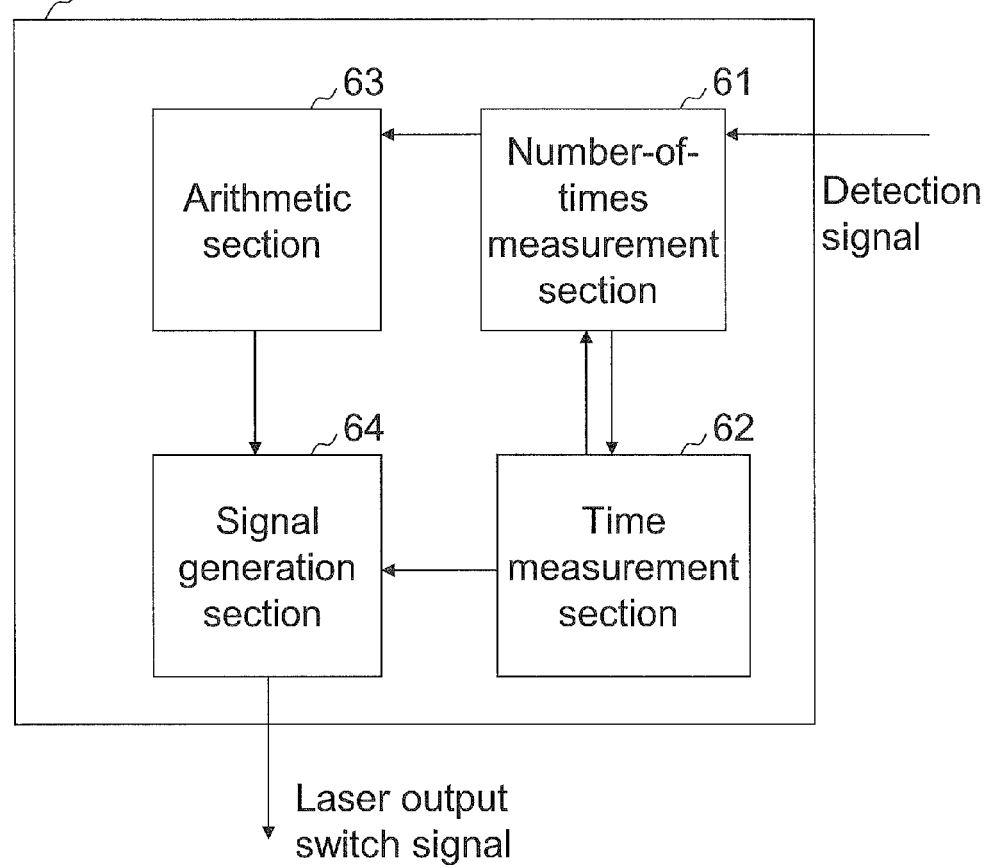
FIG. 11 is a block diagram showing the structure of a laser output switch signal generation section according to a third embodiment of the present invention.
Figure 12:
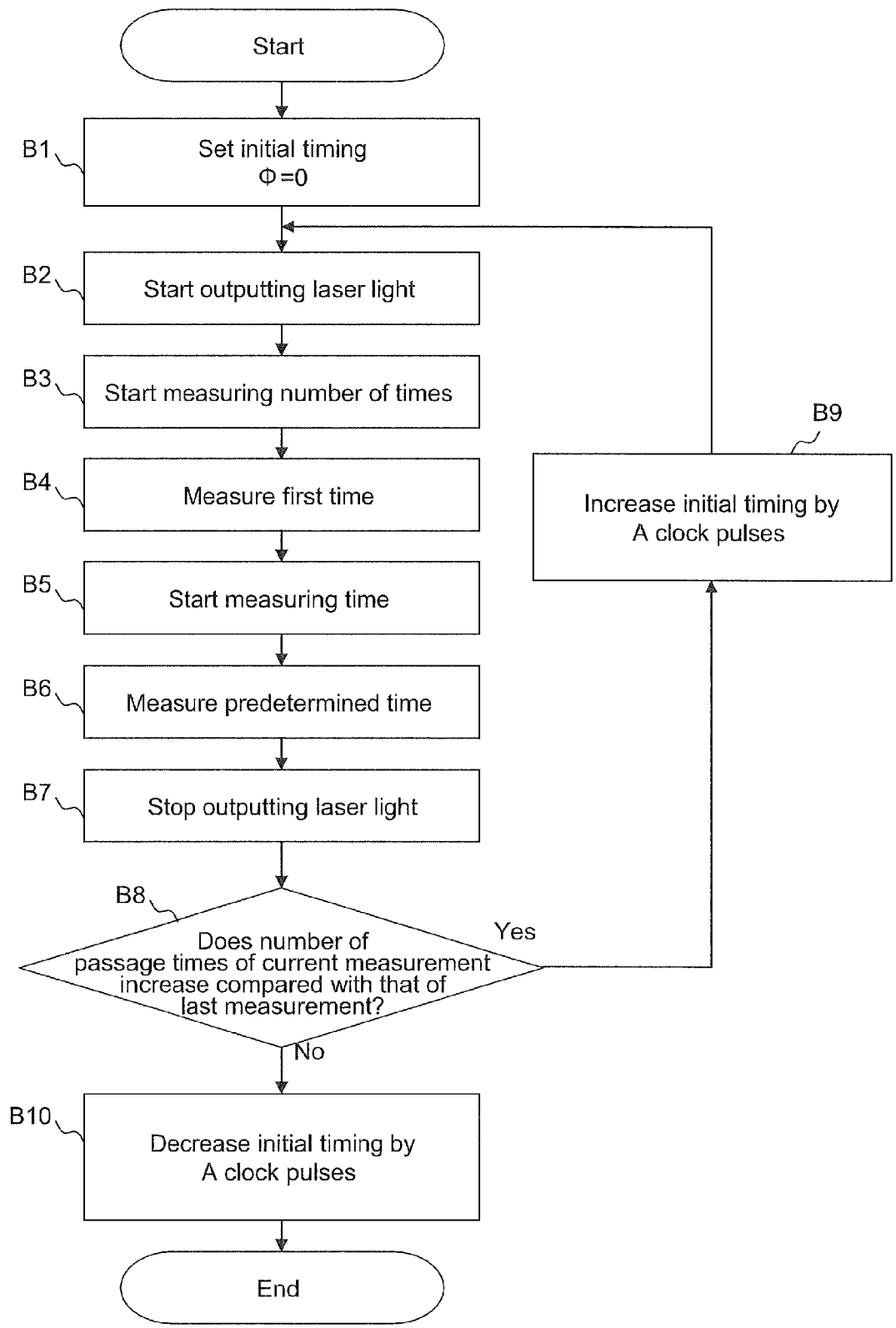
FIG. 12 is a flow chart describing a flow of processes of the laser output switch signal generation section according to the third embodiment of the present invention.
Figure 13:
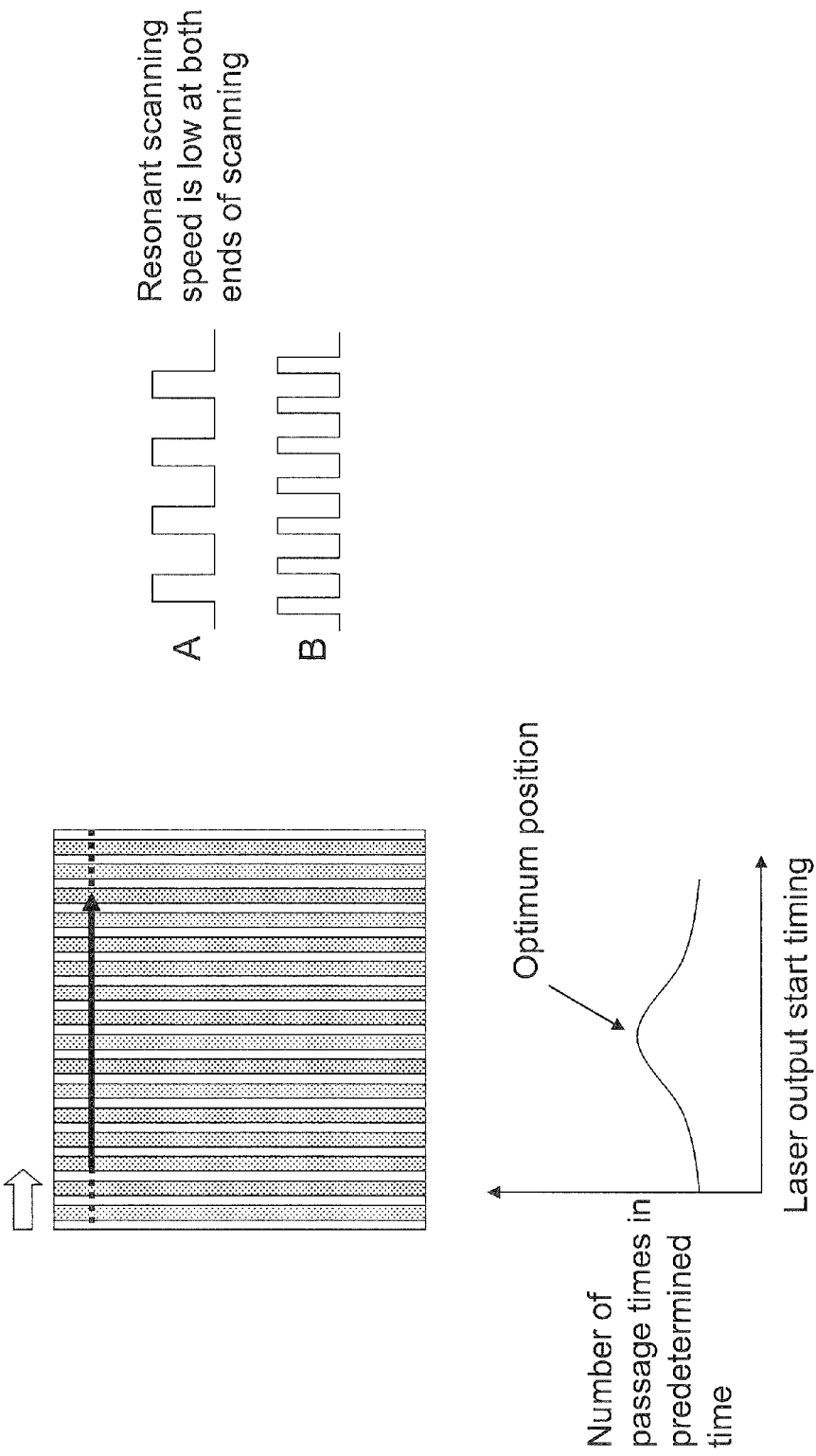
FIG. 13 is a schematic diagram describing the concept of the processes of the laser output switch signal generation section according to the third embodiment of the present invention.

FIG. 11 shows the structure of laser output switch signal generation section 6 according to a third embodiment of the present invention. FIG. 12 shows a flow of processes of laser output switch signal generation section 6. FIG. 13 shows the concept of the processes of laser output switch signal generation section 6.

As described above, the resonant scanning element has a speed distribution profile in which the scanning speed becomes the maximum at the center of scanning and becomes low at both ends of scanning when the maximum deflection angle is around 45 degrees or less. In other words, the number of times the projected laser light passes through light radiation members 3A for a predetermined time is small at both ends of scanning where the scanning speed is low and is large at the center of scanning where the scanning speed is high. Thus, when light radiation members 3A are irradiated with and scanned by laser light for a predetermined time or less corresponding to one line, the number of times that the laser light passes through light radiation members 3A is large nearly at the center of scanning and is small at both ends of scanning.

In other words, the laser output switch signal is generated such that when scanned laser light is projected for a time corresponding to one line, the number of times that scanned laser light passes through light radiation members 3A for a predetermined time becomes the maximum. As a result, laser light that is output is caused to synchronize with driving of the resonant scanning element.

FIG. 12 shows an example of an algorithm that accomplishes the foregoing synchronization.

As shown in FIG. 12, signal generation section 64 sets the initial laser output start timing to 0 and then generates the laser output switch signal that causes the resonant scanning element to resonate in a resonant scanning direction at the initial timing (at step B1). When laser light source section 1 starts outputting laser light (at step B2), number-of-times measurement section 61 starts measuring the number of times scanned laser light has passed through light radiation members 3A (at step B3). When scanned laser light has passed through light radiation members 3A first time (at step B4), number-of-times measurement section 61 sends the signal to time measurement section 62. Time measurement section 62 is triggered by the signal to start measuring the time (at step B5).

When time measurement section 62 has measured the predetermined time corresponding to one line, time measurement section 62 sends a signal to signal generation section 64 and number-of-times measurement section 61 (at step B6). When signal generation section 64 receives the signal, signal generation section 64 stops generating the laser output switch signal (at step B7).

Number-of-times measurement section 61 determines that the measurement has been completed based on the signal received from time measurement section 62 and sends the number of passage times (namely, the number of times that the scanned laser light has passed through light radiation members 3A in the predetermined time) to arithmetic section 63.

Arithmetic section 63 stores the number of passage times that number-of-times measurement section 61 has measured (at step B8).

After the foregoing measurement operation is completed, the initial laser output start timing is increased by a predetermined number of clock pulses (at step B9, FIG. 13). Thereafter, the measurement operation is repeated at the increased initial laser output start timing.

FIG. 13 shows a distribution in which the initial laser output start timing is plotted on the horizontal axis and the number of passage times is plotted on the vertical axis. Arithmetic section 63 detects the position at which the number of passage times becomes the maximum.

Whenever the measurement operation has been completed, arithmetic section 63 determines whether or not the number of passage times of the current measurement operation increases compared with that of the last measurement operation (at step B8). Unless the number of passage times increases, arithmetic section 63 decreases the initial laser output start timing by a predetermined number of clock pulses (at step B10). This timing becomes the initial timing at which the number of passage times becomes the maximum.

Signal generation section 64 generates the laser output switch signal at the initial laser output start timing calculated by arithmetic section 63.

The laser output switch signal can be optimally generated based on the foregoing algorithm.

(2-4) Fourth Embodiment

Figure 14:
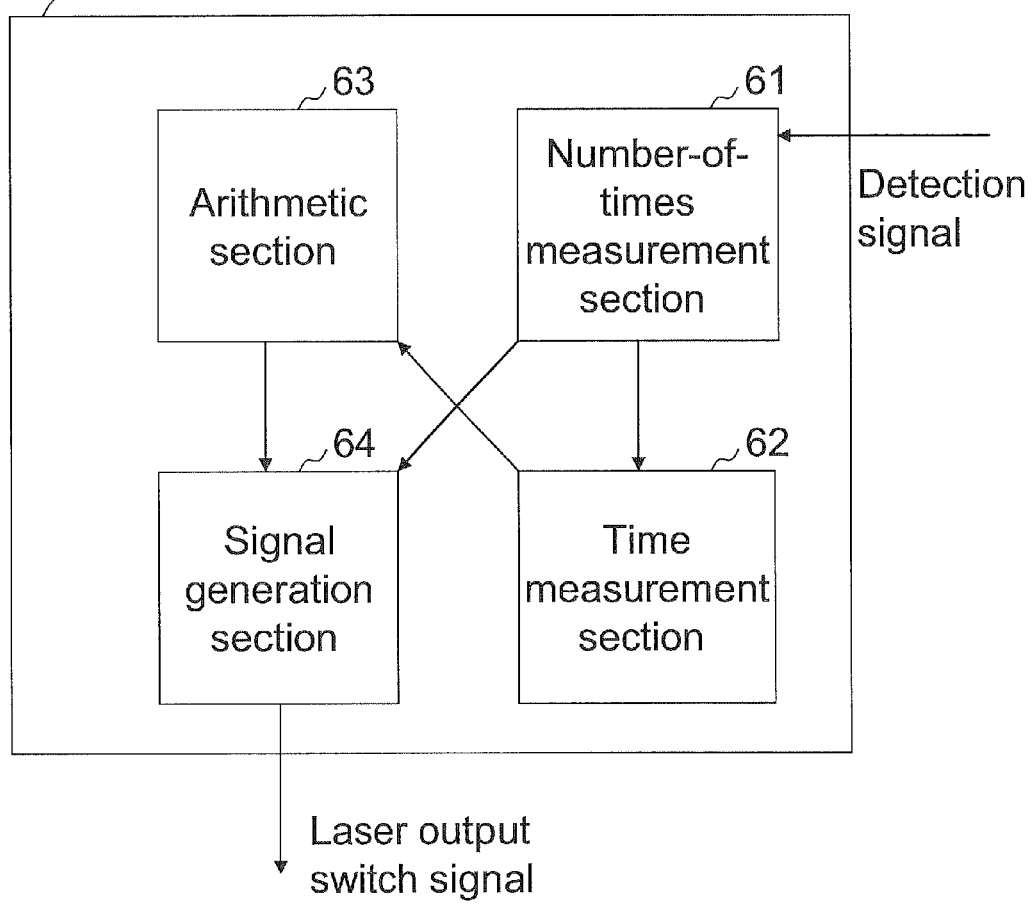
FIG. 14 is a block diagram showing the structure of a laser output switch signal generation section according to a fourth embodiment of the present invention.
Figure 15:
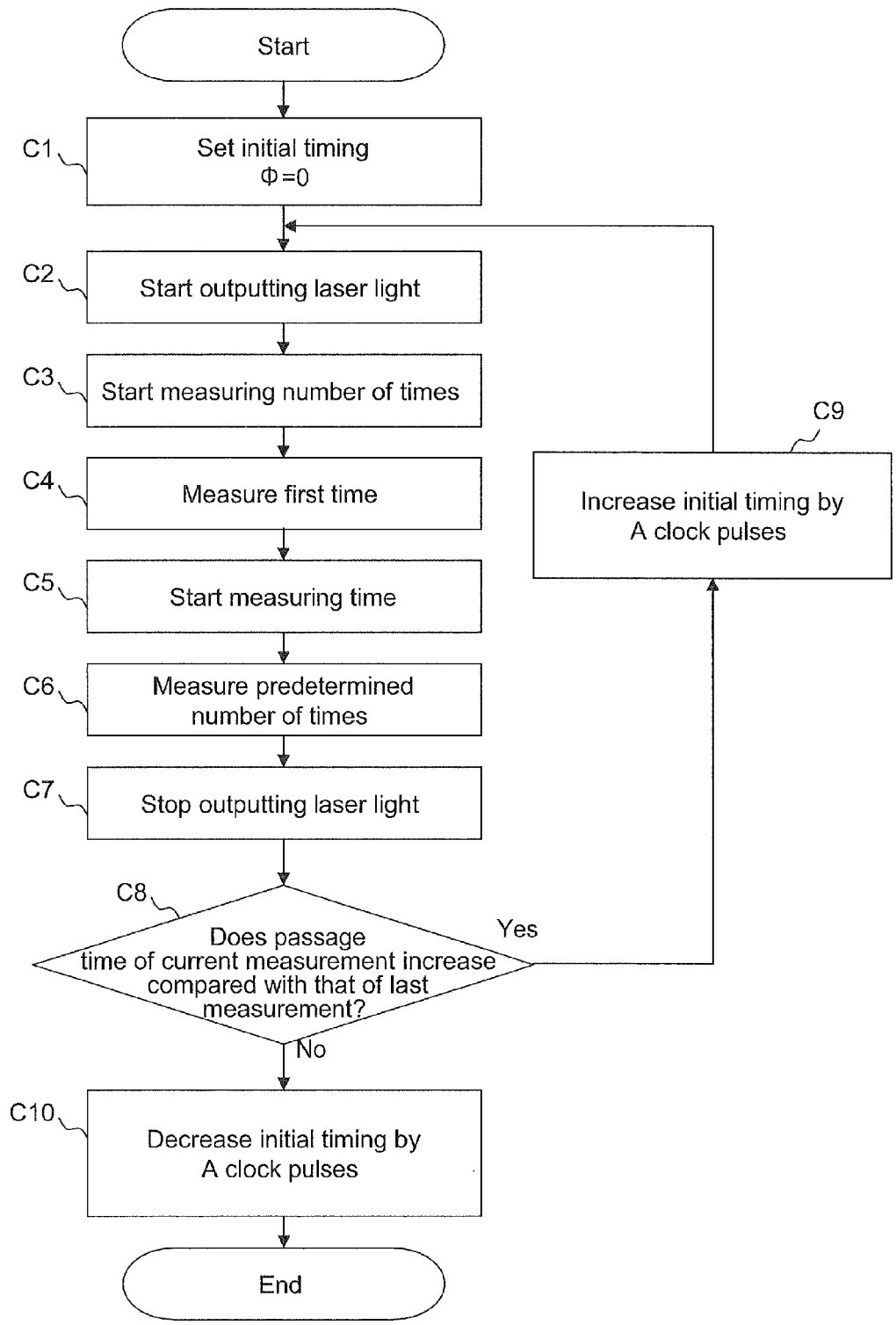
FIG. 15 is a flow chart describing a flow of processes of the laser output switch signal generation section according to the fourth embodiment of the present invention.

FIG. 14 shows the structure of laser output switch signal generation section 6 according to a fourth embodiment of the present invention. FIG. 15 shows a flow of processes of laser output switch signal generation section 6. FIG. 16 shows the concept of the processes of laser output switch signal generation section 6.

As described above, the resonant scanning element has a speed distribution profile in which the scanning speed becomes the maximum at the center of scanning and becomes low at both ends of scanning when the maximum deflection angle is around 45 degrees or less. In other words, the time during which scanned laser light passes through light radiation members 3A a predetermined number of times is long at both ends of scanning where the scanning speed is low and is short at the center of scanning where the scanning speed is high.

In other words, the laser output switch signal is generated such that when scanned laser light is projected for a time corresponding to one line, the time during which scanned laser light passes through light radiation members 3A for the predetermined number of times becomes the minimum. As a result, laser light that is output is caused to synchronize with driving of the resonant scanning element.

FIG. 15 shows an example of an algorithm that accomplishes the foregoing synchronization.

As shown in FIG. 15, signal generation section 64 sets the initial laser output start timing to 0 and then generates the laser output switch signal that causes the resonant scanning element to resonate in a resonant scanning direction at the initial timing (at step C1). When laser light source section 1 starts outputting laser light (at step C2), number-of-times measurement section 61 starts measuring the number of times that scanned laser light has passed through light radiation members 3A (at step C3). When scanned laser light has passed through light radiation members 3A first time (at step C4), number-of-times measurement section 61 sends a signal to time measurement section 62. Time measurement section 62 is triggered by the signal to start measuring the time (at step C5).

When number-of-times measurement section 61 has measured the time during which the predetermined number of times corresponds to one line, number-of-times measurement section 61 sends a signal to signal generation section 64 and time measurement section 62 (at step C6). When signal generation section 64 receives the signal, signal generation section 64 stops generating the laser output switch signal (at step C7).

Time measurement section 62 determines that the measurement has been completed based on the signal received from number-of-times measurement section 61 and sends the measured passage time (namely, the time during which the projected laser light has passed through light radiation members 3A the predetermined number of times) to arithmetic section 63.

Arithmetic section 63 stores the passage time that time measurement section 62 has measured (at step C8).

After the foregoing measurement operation is completed, the initial laser output start timing is increased by a predetermined number of clock pulses (at step C9, FIG. 16). Thereafter, the measurement operation is repeated at the increased initial laser output start timing.

FIG. 16 shows a distribution in which the initial laser output start timing is plotted on the horizontal axis and the passage time is plotted on the vertical axis. Thus, arithmetic section 63 detects the position at which the passage time becomes the minimum.

Whenever the measurement operation has been completed, arithmetic section 63 determines whether or not the passage time of the current measurement operation decreases compared with that of the last measurement operation (at step C8). Unless the passage time decreases, arithmetic section 63 decreases the initial laser output start timing by a predetermined number of clock pulses (at step B10). This timing becomes the initial timing at which the passage time becomes the minimum.

Signal generation section 64 generates the laser output switch signal at the initial laser output start timing calculated by arithmetic section 63.

The laser output switch signal can be optimally generated based on the foregoing algorithm.

With reference to the embodiments, the present invention has been described. However, it should be understood by those skilled in the art that the structure and details of the present invention may be changed in various ways without departing from the scope of the present invention.

The present application claims a priority based on Japanese Patent Application JP 2010-273547 filed on Dec. 8, 2010, the entire contents of which are incorporated herein by reference in its entirety.

The invention claimed is:

1. An image projection device, comprising:
a laser light source section that outputs laser light;
a laser scanning section that deflects the laser light that is output from said laser light source section and scans the laser light;
a projection target section to which said laser scanning section projects the scanned laser light;
a light detection section that detects light radiated from said projection target section; and
a control section that controls said laser light source section,
wherein said projection target section is composed of light radiation members that radiate light that said light detection section can detect when the scanned laser light is projected to said light radiation members, said light radiation members being regularly arranged; and non-light radiation members that do not radiate light that said light detection section can detect when the scanned laser light is projected to said non-light radiation members,
wherein said control section includes:
a laser output switch signal generation section that generates a switch signal that switches between an ON state and an OFF state of laser light that is output from said laser light source section based on a detection result of said light detection section; and
a laser light source modulation signal generation section that generates a modulation signal of said laser light source based on the switch signal generated by said laser output switch signal generation section and an image signal that is input from the outside of said image projection device, and
wherein said laser output switch signal generation section includes:
a number-of-times measurement section that measures the number of passage times that the scanned laser light has passed through said light radiation members based on the detection result of said light detection section;
a time measurement section that is triggered to measure an elapsed time when said number-of-times measurement section measures the number of passage times;
an arithmetic section that calculates an initial timing at which said laser light source section starts outputting the laser light based on the measurement results of said number-of-times measurement section and said time measurement section; and
a signal generation section that generates said switch signal at the initial timing calculated by said arithmetic section.

2. The image projection device as set forth in claim 1,
wherein said laser scanning section includes a scanning element that reciprocally resonates,
wherein said number-of-times measurement section measures the number of passage times that the scanned laser light has passed through said light radiation members while said scanning element scans one line in a scanning direction where said scanning element resonates,
wherein said time measurement section measures the time during which the scanned laser light has passed through said light radiation members a predetermined number of times while said scanning element scans one line in the scanning direction where said scanning element resonates,
wherein said arithmetic section calculates said initial timing such that the distribution of the time during which the scanned laser light has passed through said light radiation members for the predetermined number of times while said scanning element scans one line in the scanning direction where said scanning element resonates becomes symmetrical with respect to the center of the laser output time for one line, and
wherein said signal generation section generates said switch signal at the initial timing calculated by said arithmetic section.

3. The image projection device as set forth in claim 1,
wherein said laser scanning section includes a scanning element that reciprocally resonates,
wherein said number-of-times measurement section measures the number of passage times that the scanned laser light has passed through said light radiation members while said scanning element scans one line in a scanning direction where said scanning element resonates,
wherein said time measurement section measures the time during which the scanned laser light has passed through said light radiation members a predetermined number of times while said scanning element scans one line in the scanning direction where said scanning element resonates,
wherein said arithmetic section calculates said initial timing such that the distribution of the time during which the scanned laser light has passed through said light radiation members for the predetermined number of times while said scanning element scans one line in the scanning direction where said scanning element resonates denotes that the center of the laser output time for one line becomes the minimum, and
wherein said signal generation section generates said switch signal at the initial timing calculated by said arithmetic section.

4. The image projection device as set forth in claim 1,
wherein said laser scanning section includes a scanning element that reciprocally resonates,
wherein said time measurement section measures a predetermined time while said scanning element scans one line in a scanning direction where said scanning element resonates,
wherein said number-of-times measurement section measures the number of passage times the scanned laser light has passed through said light radiation members in said predetermined time while said scanning element scans one line in a scanning direction where said scanning element resonates,
wherein said arithmetic section calculates said initial timing such that the number of times the scanned laser light has passed through said light radiation members in said predetermined time while said scanning element scans one line in the scanning direction where said scanning element resonates becomes the maximum, and
wherein said signal generation section generates said switch signal at the initial timing calculated by said arithmetic section.

5. The image projection device as set forth in claim 1,
wherein said laser scanning section includes a scanning element that reciprocally resonates,
wherein said number-of-times measurement section measures the number of passage times the scanned laser light has passed through said light radiation members while said scanning element scans one line in a scanning direction where said scanning element resonates,
wherein said time measurement section measures the time during which the scanned laser light has passed through said light radiation members a predetermined number of times while said scanning element scans one line in the scanning direction where said scanning element resonates,
wherein said arithmetic section calculates said initial timing such that the time during which the scanned laser light has passed through said light radiation members for the predetermined number of times while said scanning element scans one line in the scanning direction where said scanning element resonates becomes the minimum, and
wherein said signal generation section generates said switch signal at the initial timing calculated by said arithmetic section.

6. The image projection device as set forth in claim 1
wherein said laser scanning section includes at least a scanning element that reciprocally resonates in a scanning direction where said scanning element scans the laser light at the highest speed.

7. The image projection device as set forth in claim 1
wherein said projection target section is formed in a plane shape and said light radiation members and said non-light radiation members are equally arranged in the direction where said scanning element scans the laser light at the highest speed.

8. The image projection device as set forth in claim 1
wherein said light radiation members and said non-light radiation members are regularly arranged beyond a drawing range.

9. An image projection method for an image projection device, including:
a laser light source section that outputs laser light;
a laser scanning section that deflects the laser light that is output from said laser light source section and scans the laser light;
a projection target section to which said laser scanning section projects the scanned laser light;
a light detection section that detects light radiated from said projection target section; and
a control section that controls said laser light source section,
wherein said projection target section is composed of light radiation members that radiate light that said light detection section can detect when the scanned laser light is projected to said light radiation members, said light radiation members being regularly arranged; and non-light radiation members that do not radiate light that said light detection section can detect when the scanned laser light is projected to said non-light radiation members,
said image projection method comprising:
a switch signal generation step that causes said control section to generate a switch signal that switches between an ON state and an OFF state of laser light that is output from said laser light source section based on a detection result of said light detection section; and
a laser light source modulation signal generation step that causes said control section to generate a modulation signal of said laser light source based on the switch signal generated by said laser output switch signal generation section and an image signal that is input from the outside of said image projection device,
wherein said laser output switch signal generation step includes:
a number-of-times measurement step that measures the number of passage times that the scanned laser light has passed through said light radiation members based on the detection result of said light detection section;
a time measurement step that is triggered to measure an elapsed time when the number of passage times is measured at said number-of-times measurement step;
an arithmetic step that calculates an initial timing at which said laser light source section starts outputting the laser light based on the measurement results obtained at said number-of- times measurement step and said time measurement step; and
a signal generation step that generates said switch signal at the initial timing calculated at said arithmetic step.

10. The image projection device as set forth in claim 2,
wherein said laser scanning section includes at least a scanning element that reciprocally resonates in a scanning direction where said scanning element scans the laser light at the highest speed.

11. The image projection device as set forth in claim 3,
wherein said laser scanning section includes at least a scanning element that reciprocally resonates in a scanning direction where said scanning element scans the laser light at the highest speed.

12. The image projection device as set forth in claim 4,
wherein said laser scanning section includes at least a scanning element that reciprocally resonates in a scanning direction where said scanning element scans the laser light at the highest speed.

13. The image projection device as set forth in claim 5,
wherein said laser scanning section includes at least a scanning element that reciprocally resonates in a scanning direction where said scanning element scans the laser light at the highest speed.

14. The image projection device as set forth in claim 2,
wherein said projection target section is formed in a plane shape and said light radiation members and said non-light radiation members are equally arranged in the direction where said scanning element scans the laser light at the highest speed.

15. The image projection device as set forth in claim 3,
wherein said projection target section is formed in a plane shape and said light radiation members and said non-light radiation members are equally arranged in the direction where said scanning element scans the laser light at the highest speed.

16. The image projection device as set forth in claim 4,
wherein said projection target section is formed in a plane shape and said light radiation members and said non-light radiation members are equally arranged in the direction where said scanning element scans the laser light at the highest speed.

17. The image projection device as set forth in claim 5,
wherein said projection target section is formed in a plane shape and said light radiation members and said non-light radiation members are equally arranged in the direction where said scanning element scans the laser light at the highest speed.

18. The image projection device as set forth in claim 6,
wherein said projection target section is formed in a plane shape and said light radiation members and said non-light radiation members are equally arranged in the direction where said scanning element scans the laser light at the highest speed.

19. The image projection device as set forth in claim 2, wherein said light radiation members and said non-light radiation members are regularly arranged beyond a drawing range.

20. The image projection device as set forth in claim 3, wherein said light radiation members and said non-light radiation members are regularly arranged beyond a drawing range.

* * * * *